Dec. 27, 1938.  H. M. HOBART  2,141,912
POWER TRANSMISSION SYSTEM
Filed Feb. 13, 1937
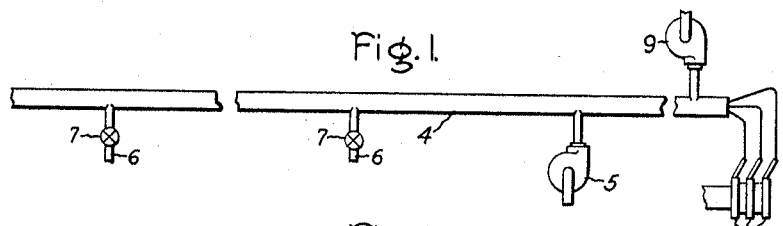
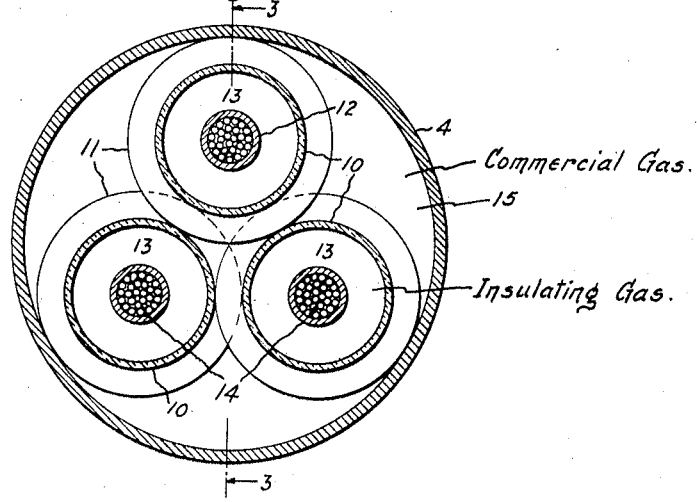
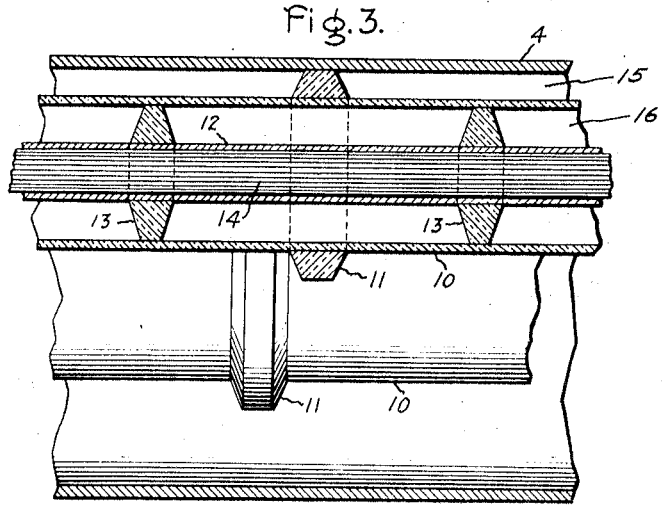
Inventor:
Henry M. Hobart,
by Harry E. Dunham
His Attorney.

Patented Dec. 27, 1938

2,141,912

UNITED STATES PATENT OFFICE 2,141,912

POWER TRANSMISSION SYSTEM

Henry M. Hobart, Niskayuna, N. Y., assignor to General Electric Company, a corporation of New York Application February 13, 1937, Serial No. 125,623

10 Claims. (Cl. 247—3)

My invention has for its object the provision of an improved power transmission system wherein pipes are provided to carry gas under high pressure over long distances, as between cities, for example, and usually underground, for illuminating and heating purposes and are also utilized as conduits and protective means for high voltage electric conductors. My improved system, among other things, includes the feature of separating the insulating medium of the conductor from the gas which is being transported or conveyed by the pipe line for use as such. For the purposes hereof, this gas will be referred to as commercial gas. More specifically, each electric conductor is enclosed in a tube located within the pipe line. The conductors instead of being provided with wrapped on insulation as usual for high voltage currents are left bare, or at least have insufficient applied insulation to act as such under the applied voltage conditions. To effectively insulate the conductors, the tube or tubes containing them are filled with an insulating gas under high pressure, one which usually will be greater than the normal pressure of the commercial gas in the outside pipe. As a result, the wall of the tube containing a conductor is subject not to the high pressure of the insulating or of the commercial gas but to an appreciably lesser pressure, i. e., that represented by the difference of pressure between the two gases.

For a consideration of what I believe to be novel and my invention, attention is directed to the accompanying description and the claims appended thereto.

In the accompanying drawing illustrating an embodiment of my invention, Fig. 1 is a diagrammatic view of a power transmission system; Fig. 2 is a cross-section of the gas pipe and conductors taken on line 3—3 of Fig. 3; and Fig. 3 is a longitudinal section of a short length thereof.

Referring to Fig. 1, 4 illustrates a pipe made of steel or other suitable material adapted to withstand relatively high internal gas pressure. The pipe has two purposes, one being to convey gas under relatively high pressure from one location to another, as between cities, for example, and the other to serve as a protector for electrical conductors, and also for the tubes in which they are located. The pressure within the pipe will naturally vary with the distance over which the gas has to be conveyed. It may, for example, be of the order of 500 pounds per square inch. Gas is supplied to the pipe from any suitable source by one or more pumps or compressors 5.

Gas is drawn off from the pipe to supply consumption devices by suitably spaced pipes 6 which contain controlling valves 7, usually designed to reduce the gas pressure to that suitable for use by the customer.

Inside of the pipe, in the present illustration, are located three electrical conductors supported and arranged in a special manner, as will appear later. I may, however, use a single conductor in certain cases and supported in a generally similar manner. Current is supplied to the conductors by a suitable generator which may deliver direct or alternating current. As shown, the conductors receive alternating three-phase current from the collector rings 8 of a generator. In order to insulate the conductors and also protect them from the effects of the commercial gas, each is enclosed in a tube, as will appear later, and an insulating gas, carbon monoxide, for example, or methane, under determined pressure is supplied to the tubes for the conductors by a pump or compressor 9. The gas selected will depend upon the requirements of each case, such as the voltage of the system and also the heat transfer rate required. The insulating gas pressure is higher than that of the commercial gas so that if a leak occurs, the insulating gas will flow outwardly and not permit inward flow of the commercial gas into the tubes, which, depending upon its character, might have a highly objectionable effect on the conductors and their supports, and at any rate might not be the most suitable with respect to pressure and conditioning or dielectric strength or as regards its thermal transfer properties. The insulating gas may or may not be circulated as desired; for most purposes, it is only necessary to maintain it under static pressure, say of the order of 600 pounds per square inch. A suitable gas under such a pressure will insulate the conductors even at very high voltages without the application of any insulation directly to the conductors.

Referring to Figs. 2 and 3, 4 indicates a pipe of suitable size and strength to withstand internal pressure and injuries due to external causes. Where the installation is made with existing gas pipe lines, the pipe will usually be of steel but for new installation, it may be made of insulating material, such as thick glass of high tensile strength. Whatever material is used, it should not be adversely affected by the material surrounding it, as the earth, for example. Inside of the pipe are three equally spaced tubes 10 which may be of metal or of insulating material. As shown, they are of insulating material.

For example, the tubes may be made of laminated fibrous material such as paper, or fabric, and treated with a phenolic condensation product or its equivalent, which is cured by heat and pressure. Where the tubes are joined at their ends, suitable joint coverings or splices should be provided which are gas tight. The specific construction is not important for the purposes hereof. The tubes are supported in their proper positions by insulating supports 11 which are in the form of rings and are slipped over the tubes and properly spaced apart so as adequately to support them. It will be noted that each support 11 engages the inner wall of the outer pipe 4 and also the enclosing tubes 10 of two of the other conductors. The supports will be applied to the tubes and properly spaced after which the tubes will be pulled or pushed into the outer pipe 4.

The electrical conductors 12 are each located inside of a tube and are supported in concentric relation by spaced insulating supports 13 of ring-like form. The supports must not make a close fit with the tubes over their entire area because it is necessary that there be a longitudinal gas passage through the tube. The conductors 12 are shown as tubes and desirably will be made in relatively short lengths as will also the pipes 4 and tubes 10. The conductor tubes 12 may be united by electric welding or other means. One length after the other will be so united and between operations the enclosing tube and pipe lengths will be slipped into place and then properly united. In some cases, it will be desirable for electrical reasons to augment the current carrying capacity of the hollow conductors 12. This may be done by drawing into them from a reel a bare stranded conductor 14. This conductor will ordinarily be drawn into place after a large number of tube lengths 12 have been united. By this arrangement, any adverse effect due to joints between conductor parts is practically eliminated.

It will be seen that in effect longitudinal chambers are provided inside of the pipe line. Chamber 15 carries the commercial gas, and chambers 16, one in each tube 10, contain the insulating gas. By this arrangement, the walls of the tubes 10 are subjected only to the difference of pressure of the gases instead of to the total pressure of one or the other of the gases. As the conductors heat, due to the current flowing therein, the heat is radiated or transmitted by the insulating gas to the tubes 10 and by the commercial gas the heat is radiated or transmitted to the wall of the pipe 4 which will usually be underground. This arrangement has the further advantage that the heat of the conductors acting on the gases reduces the condensation of the moisture content which is usualy present in commercial gas and which is a menace as regards occasioning internal corrosion and rusting.

My improved system has certain material and important advantages of which the following may be mentioned. The outer pipe serves to convey high pressure gas for commercial purposes under a predetermined pressure. The same pipe serves as an enclosure for the high potential conductor or conductors so that they are protected from accidental injury. The outer pipe being underground, the conductors will not be exposed to the effects of snow and sleet as is the case with overhead conductors. The arrangement also obviates the use of expensive towers and string insulators required with overhead transmission lines. By enclosing the conductor or conductors inside of an inner pipe or tube, the insulating and commercial gases are separately maintained. To effectively insulate the conductors, the pressure of the insulating gas is high but the danger of bursting the tubes is obviated by exposing their outer surfaces to a relatively high external pressure. The aqueous moisture which is inevitably present in commercial gas would not be permissible in the inner tubes as it would greatly decrease the dielectric resistance of the insulators to puncture and to surface creepage. In the system of this invention, the aqueous moisture cannot gain access to the internal chambers of the inner tubes since the gas pressure therein exceeds the surrounding gas pressure in the pipe chamber and ensures that all leakage shall be outward. This permits of greater freedom in choice of material for the inner tubes, particularly when it is desired that the material shall be nonmetallic.

The longitudinal flow of the commercial gas also assists in dissipating the $I^2R$ losses in the electrical conductors.

What I claim as new and desire to secure by Letters Patent of the United States is:

1. A power transmission system comprising a pipe for containing and transporting commercial gas under high pressure for consumption purposes, a means for supplying combustible gas to the pipe under high pressure, a tube located inside of the pipe, an uninsulated electrical conductor located within the tube, and a means for supplying the tube with insulating gas under a pressure which is higher than that of the combustible gas for insulating the conductor, the gases in the pipe and tube co-operating to reduce the bursting stresses on the walls of the tube.

2. A power transmission system comprising a pipe for containing and transporting gas under high pressure for consumption purposes, a means for supplying combustible gas to the pipe under super-atmospheric pressure, conduit means for withdrawing gas from the pipe, a tube located inside of the pipe, an uninsulated electrical conductor extending lengthwise of the tube for transmitting high tension electric current, and a means for supplying and maintaining the tube filled with insulating gas under super-atmospheric pressure, said pressure being higher than that of the combustible gas, the gases on the inside and the outside of the tube partially balancing each other, the gas in the pipe also transmitting heat from the conductor to the wall of the pipe and at the same time reducing the moisture content of the gas.

3. A power transmission system comprising a pipe for containing and transporting gas under pressure for consumption purposes, a means for supplying combustible gas to the pipe, conduit means for withdrawing gas from the pipe, a tube located inside of the pipe, means for supporting the tube within the pipe and out of contact with the inner wall thereof, an uninsulated electrical conductor supported inside of the tube out of contact with the wall thereof, and means for supplying gas to the tube under sufficiently high pressure to insulate it, the gas in the pipe having a lower pressure than that in the tube and conveying heat from the conductor and insulating gas to the wall of the pipe.

4. A power transmission system comprising an outer pipe for transporting gas under pressure for consumption purposes, a body of combustible gas flowing through the pipe, a tube located inside of the pipe in spaced relation with the wall thereof, an uninsulated electrical conductor located within the tube in spaced relation with the wall thereof, the temperature of which changes with load conditions, and a body of high pressure gas in the tube under static conditions for insulating the conductor therein, the two bodies of gas being separately maintained and mutually co-operating to convey heat from the conductor to the wall of the pipe and also to decrease the condensation occasioned by the moisture content in the gas being supplied for consumption purposes.

5. A power transmitting system comprising a metallic pipe containing a body of combustible gas adapted to flow therethrough under super-atmospheric pressure, a tubular enclosure within the pipe in spaced relation thereto, an uninsulated electrical conductor located within the enclosure and extending lengthwise of the pipe, spacing means located within the enclosure and engaging the conductor for supporting it in fixed relation to the wall thereof, and a filling of non-combustible gas for the enclosure under such super-atmospheric pressure that it serves as the insulating medium for the conductor, said pressure being higher than that of the gas in the enclosing metallic pipe so that any leakage therefrom will be outward.

6. A power transmission system comprising an outer pipe for transmitting gas under pressure for consumption purposes, a plurality of tubes located inside of the pipe, insulating means for supporting the tubes out of contact with each other and with the outer pipe, an electrical conductor in each of the tubes, means for supporting each of the conductors out of contact with the wall of its containing tube, and bodies of different kinds of gas under pressure filling the pipe and also the tubes, the pressure of the gas in the tube being greater than that of the gas in the pipe so that any leakage from the tube will be outward.

7. A power transmission system comprising an outer metal pipe, a plurality of tubes located inside of the pipe, a hollow electrical conductor in each of the tubes, insulating means for supporting the tubes out of contact wtih the pipe and with each other, other insulating means for supporting the hollow conductors out of contact with the tubes, electrical conductors located in and contacting with the hollow conductors, a body of gas under super-atmospheric pressure in each of the tubes for insulating the hollow conductor from the wall thereof, a second body of gas also at super-atmospheric pressure but lower than that of the first-mentioned gas, which fills the space not otherwise occupied within the pipe and conveys heat from the conductors outwardly, the heat so transmitted also reducing condensation due to the moisture content of the said second body, and means for removing gas of said second body for commercial purposes.

8. A power transmission system for use in conveying commercial combustible gas and high voltage electric current in which the aqueous moisture in the commercial gas is prevented from impairing the electrical insulating means by locating uninsulated electrical conductors in inner tubes containing suitable insulating gas at a higher pressure than the pressure of the commercial gas so that any leakage shall be outward, thus preventing the aqueous moisture from affecting the high voltage insulation.

9. A power transmission system comprising a pipe line defining a longitudinal chamber, a tubular means located within the pipe line and defining an internal chamber, a conductor located within the tubular means, supports for the conductor located within the tubular means holding it out of contact with the wall of the tubular means, a filling of insulating gas under a determined super-atmospheric pressure for the tubular means, a filling of gas also under a predetermined but lower pressure for the pipe line, said gas acting on the tubular means to reduce the effective pressure thereon due to the insulating gas, and conduit means through which gas from the pipe line may be removed for industrial application.

10. A cable system for transmitting high voltage electric current comprising a rigid wall metal pipe containing gas, means supplying gas to the pipe under high pressure, a closed tube located inside of the pipe, the outer wall of which is acted upon by the high pressure gas, an uninsulated conductor means located within the tube, spaced means for supporting the conductor means inside of the tube, and a means supplying the interior of the tube with a gas under sufficiently high pressure effectively to insulate the conductor means, the last mentioned pressure being greater than the first so that any leakage of insulating gas will be outward and the bursting stress on the tube due to internal pressure being largely counterbalanced by the pressure of the gas acting on the outer surface thereof, the gas in the pipe serving also to convey heat from the conductor to the wall of the metal pipe.

HENRY M. HOBART.